United States Patent
Tinsley et al.

(10) Patent No.: US 7,216,019 B2
(45) Date of Patent: May 8, 2007

(54) METHOD AND SYSTEM FOR A MASS FLOW CONTROLLER WITH REDUCED PRESSURE SENSITIVITY

(75) Inventors: Kenneth E. Tinsley, Frisco, TX (US); Faisal Tariq, Allen, TX (US)

(73) Assignee: Celerity, Inc., Austin, TX (US)

( * ) Notice: Subject to any disclaimer, the term of this patent is extended or adjusted under 35 U.S.C. 154(b) by 257 days.

(21) Appl. No.: 10/886,836

(22) Filed: Jul. 8, 2004

(65) Prior Publication Data
US 2005/0288825 A1    Dec. 29, 2005

(51) Int. Cl.
    G05D 11/00    (2006.01)
    G01F 1/00     (2006.01)
    G01N 7/00     (2006.01)

(52) U.S. Cl. .................. 700/282; 702/45; 73/23.2
(58) Field of Classification Search ......... 700/282; 702/45; 73/23.2; 137/115.2
    See application file for complete search history.

(56) References Cited

U.S. PATENT DOCUMENTS

| | | | |
|---|---|---|---|
| 3,532,862 A | 10/1970 | Dahlin | |
| 3,671,725 A | 6/1972 | Bakke | |
| 3,786,492 A | 1/1974 | Carleton | |
| 4,253,480 A | 3/1981 | Kessel et al. | |
| 4,434,933 A | 3/1984 | Tamura | |
| 4,658,855 A | 4/1987 | Doyle | |
| 4,672,997 A | 6/1987 | Landis et al. | |
| 4,679,585 A | 7/1987 | Ewing | |
| 4,877,051 A | 10/1989 | Day | |
| 4,928,048 A | 5/1990 | Doyle | |
| 4,938,658 A | 7/1990 | Blotenberg | |
| 4,947,889 A | 8/1990 | Ishikawa et al. | |
| 5,048,332 A | 9/1991 | Ishikawa et al. | |
| 5,062,446 A | 11/1991 | Anderson | |
| 5,100,100 A | 3/1992 | Benson et al. | |

(Continued)

FOREIGN PATENT DOCUMENTS

| | | |
|---|---|---|
| EP | 0 110 325 B1 | 6/1984 |
| EP | 0 281 947 B1 | 9/1988 |

OTHER PUBLICATIONS

Tison S.A.: "Accurate Flow Measure In Vacuum Processing" Solid State Technology, Cowan Publ. Corp. Washington, US, vol. 39, No. 10, Oct. 1, 1996, pp. 73-74, 78, 80, 83.
International Search Report dated Feb. 22, 2006.

Primary Examiner—Alexander Kosowski
(74) Attorney, Agent, or Firm—Lowrie, Lando & Anastasi, LLP.

(57) ABSTRACT

Systems and methods for mass flow controllers which minimize false flow conditions and display a reduced sensitivity to pressure transients are disclosed. Pressure gradients that exist within the volume of a mass flow controller fluid path are minimized in order to limit the potential energy contained in compressed or pressurized process gas. Additionally, process gas pressure may be monitored using a pressure sensor. This pressure signal is utilized in conjunction with a control algorithm to cancel the detrimental effect of certain flow components. These mass flow controllers may be used as drop in replacements for legacy mass flow controllers and reduce the cost of gas sticks due to elimination of discrete components such as pressure regulators, gas filters, pressure transducers, local pressure displays, isolation valves, seals, etc.

44 Claims, 12 Drawing Sheets

U.S. PATENT DOCUMENTS

| | | | |
|---|---|---|---|
| 5,107,441 A | 4/1992 | Decker | |
| 5,129,418 A | 7/1992 | Shimomura et al. | |
| 5,141,021 A | 8/1992 | Shimomura et al. | |
| 5,158,263 A | 10/1992 | Shimizu et al. | |
| 5,222,417 A | 6/1993 | Sato | |
| 5,249,117 A | 9/1993 | Greenough et al. | |
| 5,279,154 A | 1/1994 | Vavra et al. | |
| 5,357,811 A | 10/1994 | Hoang | |
| 5,394,755 A | 3/1995 | Sudo et al. | |
| 5,441,076 A | 8/1995 | Moriya et al. | |
| 5,445,035 A | 8/1995 | Delajoud | |
| 5,524,084 A | 6/1996 | Wang et al. | |
| 5,605,178 A | 2/1997 | Jennins | |
| 5,660,207 A | 8/1997 | Mudd | |
| 5,662,143 A | 9/1997 | Caughran | |
| 5,669,408 A | 9/1997 | Nishino et al. | |
| 5,684,245 A | 11/1997 | Hinkle | |
| 5,765,283 A | 6/1998 | Mudd | |
| 5,791,369 A | 8/1998 | Nishino et al. | |
| 5,816,285 A | 10/1998 | Ohmi et al. | |
| 5,850,850 A | 12/1998 | Mudd | |
| 5,865,205 A | 2/1999 | Wilmer | |
| 5,868,159 A | 2/1999 | Loan et al. | |
| 5,878,765 A | 3/1999 | Lange | |
| 5,911,238 A | 6/1999 | Bump et al. | |
| 5,944,048 A | 8/1999 | Bump et al. | |
| 5,950,668 A | 9/1999 | Baumann | |
| 5,975,126 A | 11/1999 | Bump et al. | |
| 5,988,217 A | 11/1999 | Ohmi et al. | |
| 6,035,878 A | 3/2000 | Adams et al. | |
| 6,044,701 A | 4/2000 | Doyle et al. | |
| 6,074,691 A | 6/2000 | Schmitt et al. | |
| 6,119,710 A | 9/2000 | Brown | |
| 6,128,541 A | 10/2000 | Junk | |
| 6,138,708 A | 10/2000 | Waldbusser | |
| 6,142,163 A | 11/2000 | McMillin et al. | |
| 6,152,168 A | 11/2000 | Ohmi et al. | |
| 6,155,283 A | 12/2000 | Hansen et al. | |
| 6,158,679 A | 12/2000 | Ohmi et al. | |
| 6,178,995 B1 | 1/2001 | Ohmi et al. | |
| 6,216,726 B1 | 4/2001 | Brown et al. | |
| 6,217,506 B1 | 4/2001 | Phillips et al. | |
| 6,289,923 B1 | 9/2001 | Ohmi et al. | |
| 6,302,130 B1 | 10/2001 | Ohmi et al. | |
| 6,314,992 B1 | 11/2001 | Ohmi et al. | |
| 6,343,617 B1 | 2/2002 | Tinsley et al. | |
| 6,389,364 B1 | 5/2002 | Vyers | |
| 6,404,612 B1 | 6/2002 | Pattantyus | |
| 6,425,281 B1 * | 7/2002 | Sheriff et al. | 73/23.2 |
| 6,445,980 B1 * | 9/2002 | Vyers | 700/282 |
| 6,449,571 B1 | 9/2002 | Tarig et al. | |
| 6,450,190 B2 | 9/2002 | Ohmi et al. | |
| 6,539,968 B1 | 4/2003 | White et al. | |
| 6,561,218 B2 * | 5/2003 | Mudd | 137/487.5 |
| 6,575,027 B1 | 6/2003 | Larsen et al. | |
| 6,601,005 B1 | 7/2003 | Eryurek et al. | |
| 6,631,334 B2 | 10/2003 | Grosshart | |
| 6,640,822 B2 | 11/2003 | Tinsley et al. | |
| 6,681,787 B2 | 1/2004 | Tinsley et al. | |
| 6,712,084 B2 | 3/2004 | Shajii et al. | |
| 6,714,878 B2 | 3/2004 | Vyers | |
| 6,766,260 B2 * | 7/2004 | Ambrosina et al. | 702/45 |
| 6,810,308 B2 | 10/2004 | Shajii et al. | |
| 6,868,862 B2 | 3/2005 | Shajii et al. | |
| 6,962,164 B2 * | 11/2005 | Lull et al. | 137/2 |
| 7,073,392 B2 * | 7/2006 | Lull et al. | 73/861 |
| 7,089,134 B2 * | 8/2006 | Barros et al. | 702/114 |
| 2003/0234045 A1 | 12/2003 | Shajii et al. | |
| 2003/0234046 A1 | 12/2003 | Shajii et al. | |
| 2003/0234047 A1 | 12/2003 | Shajii et al. | |
| 2003/0234048 A1 | 12/2003 | Shajii et al. | |
| 2003/0236638 A1 | 12/2003 | Shajii et al. | |
| 2003/0236643 A1 | 12/2003 | Shajii et al. | |
| 2004/0083807 A1 | 5/2004 | Mudd et al. | |
| 2004/0204885 A1 | 10/2004 | Wang | |
| 2004/0256003 A1 | 12/2004 | Shajii et al. | |
| 2005/0000570 A1 | 1/2005 | Mohammed et al. | |
| 2005/0223813 A1 | 10/2005 | Lull et al. | |

* cited by examiner

Figure 2 Crosstalk Disturbance
30 PSIA nominal, 2 PSID Decay and Recovery
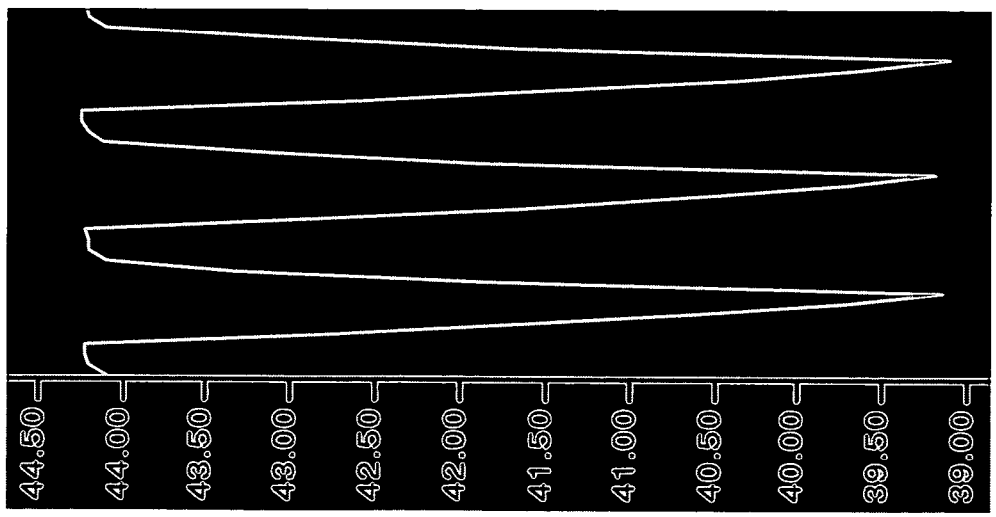
Figure 1 Persistent Perturbation
45PSIA nominal, 5 PSID peak-peak MFC Upstream Crosstalk Performance
50 sccm N2 DUT, 50% SP Step Perturbation Performance
50 sccm N2 DUT, 50% SP Step

Figure 10
PIMFC Upstream Crosstalk Performance
50 sccm N2 DUT, 50% SP Step
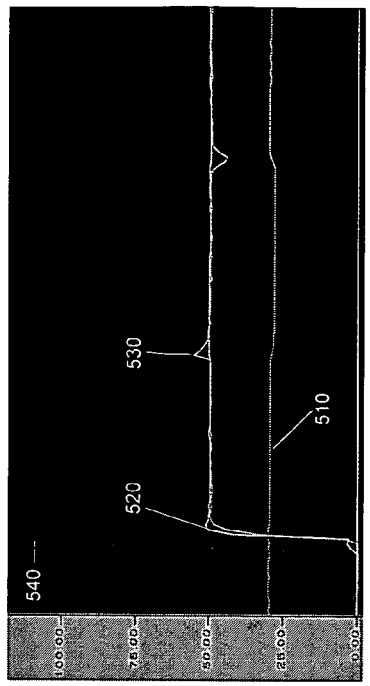
Figure 10B  G2 Value Too Low
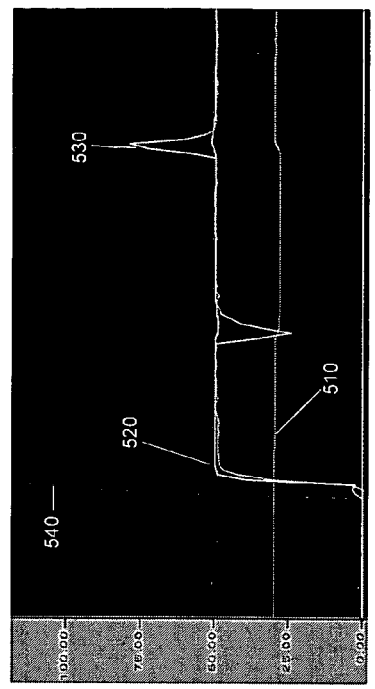
Figure 10C  G2 Value Too High
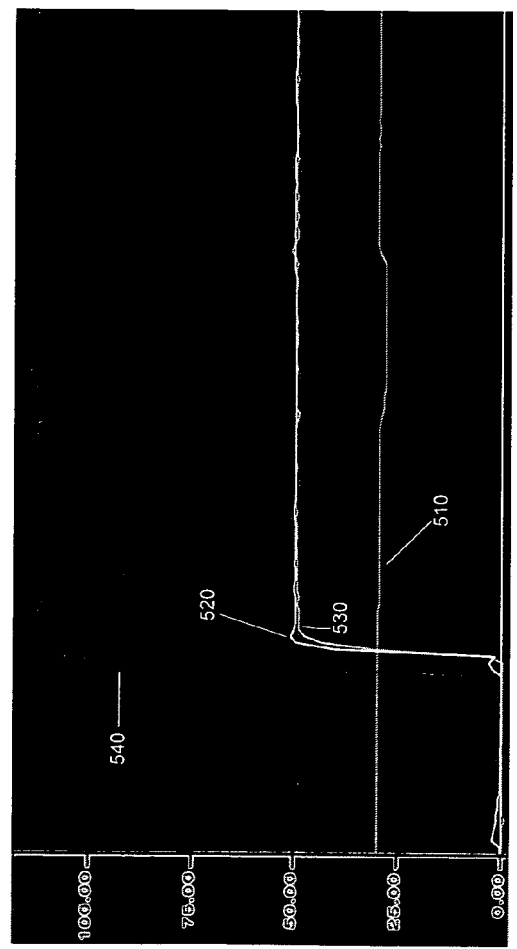
Figure 10A  G2 Value Optimized

Figure 11
PIMFC Upstream Perturbation Performance
50 sccm N2 DUT, 50% SP Step
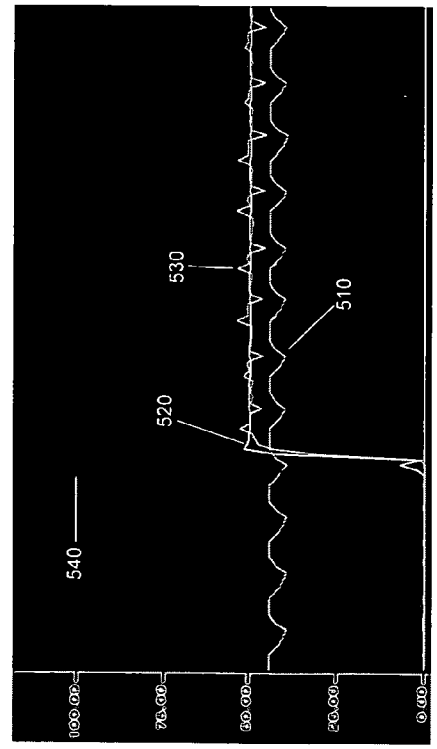
Figure 11A  G2 Value Optimized
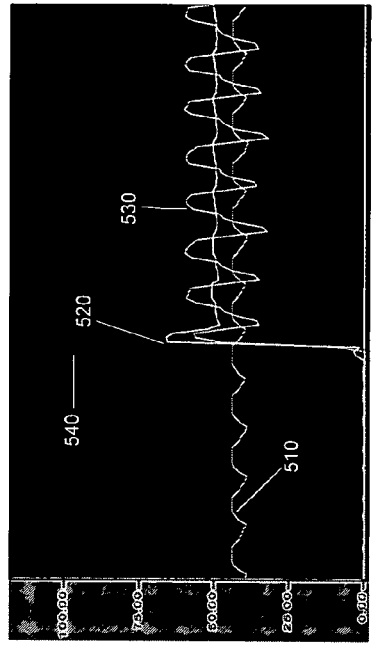
Figure 11B  G2 Value Too Low
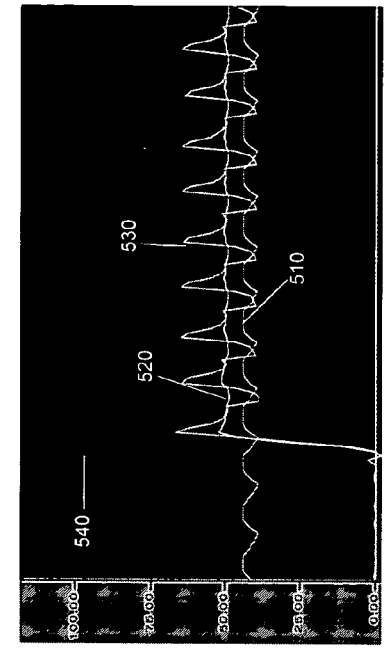
Figure 11C  G2 Value Too High

METHOD AND SYSTEM FOR A MASS FLOW CONTROLLER WITH REDUCED PRESSURE SENSITIVITY

RELATED APPLICATIONS AND PATENTS

This application is related to U.S. Pat. No. 6,343,617, entitled "System and Method of Operation of a Digital Mass Flow Controller," by Tinsley et al., issued on Feb. 5, 2002; U.S. Pat. No. 6,640,822, entitled "System and Method of Operation of a Digital Mass Flow Controller," by Tinsley et al., issued on Nov. 4, 2003; U.S. Pat. No. 6,681,787, entitled "System and Method of Operation of a Digital Mass Flow Controller," by Tinsley et al., issued on Jan. 27, 2004; U.S. Pat. No. 6,389,364, entitled "System and Method for a Digital Mass Flow Controller," by Vyers, issued on May 14, 2002; U.S. Pat. No. 6,714,878, entitled "System and Method for a Digital Mass Flow Controller," by Vyers, issued on Mar. 30, 2004; U.S. Pat. No. 6,445,980, entitled "System and Method for a Variable Gain Proportional-Integral (PI) Controller," by Vyers, issued on Sep. 3, 2002; U.S. Pat. No. 6,449,571, entitled "System and Method for Sensor Response Linearization," by Tariq et al., issued on Sep. 10, 2002; U.S. Pat. No. 6,575,027, entitled "Mass Flow Sensor Interface Circuit," by Larsen et al., issued on Jun. 10, 2003; U.S. Pat. No. 5,901,741, entitled "Flow Controller, Parts of Flow Controller, and Related Method," by Mudd et al., issued on May 11, 1999; U.S. Pat. No. 5,850,850, entitled "Flow Controller, Parts of Flow Controller, and Related Method," by Mudd, issued on Dec. 22, 1998; U.S. Pat. No. 5,765,283, entitled "Method of Making a Flow Controller," by Mudd, issued on Jun. 16, 1998. All patents and applications cited within this paragraph are fully incorporated herein by reference.

TECHNICAL FIELD OF THE INVENTION

The invention relates in general to methods and systems for operating a mass flow controller with a closed loop control system, and more particularly, to a mass flow controller with reduced sensitivity to pressure fluctuations in the flow stream.

BACKGROUND OF THE INVENTION

Modern manufacturing processes sometimes require precise stoichiometric ratio of chemical elements during particular manufacturing phases. To achieve these precise ratios, different process gases may be delivered into a process chamber during certain manufacturing phases. A gas panel may be used to deliver these process gasses to a process tool with one or more chambers or reactors. A gas panel is an enclosure containing one or more gas pallets dedicated to deliver process gases to the process tool. The gas panel is in turn composed of a group of gas pallets, which is itself composed of a group of gas sticks.

A gas stick assembly may contain several discrete components such as an inlet fitting, manual isolation valve, binary controlled pneumatic isolation valves, gas filters, pressure regulators, pressure transducers, inline pressure displays, mass flow controllers and an outlet fitting. Each of these components is serially coupled to a common flow path or dedicated channel for one particular process gas. A manifold and a valve matrix channel the outlet of each gas stick to the process chamber.

To achieve a certain stoichiometric ratio a process tool controller asserts setpoints to the mass flow controllers, and sequences the valve matrices, associated with certain gas sticks. The indicated flow value is output by the mass flow controller of each gas stick and monitored by the process tool controller.

A mass flow controller (MFC) is constructed by interfacing a flow sensor and proportioning control valve to a control system. The flow sensor is coupled to the control system by an analog to digital converter. The control valve is driven by a current controlled solenoid valve drive circuit. A mass flow measurement system is located upstream of the control valve. The control system monitors the setpoint input and flow sensor output while refreshing the control valve input and indicated flow output. The closed loop control algorithms executed by the control system operate to regulate the mass flow of process gas sourced at the inlet fitting through the proportioning control valve and outlet fitting such that the real-time difference or error between the setpoint input and indicated flow output approaches zero or null as fast as possible with minimal overshoot and as small a control time as possible. A critically damped response characteristic is desired. Furthermore, the mass flowing into the inlet fitting is desired to be equivalent to the mass flowing from the outlet fitting.

The mass flow sensor is coupled to the MFC flow path using a bypass arrangement along a partial restriction in the flow path that ensures laminar flow in the flow measurement portion of the MFC. The thermal sensor samples only a portion of gas that flows from the inlet fitting through the control valve and from the outlet fitting. A calibration and validation process is applied to the completed mass flow controller assembly to correlate the digitized value of sampled gas flow to a primary mass flow standard. The control system may execute these programmable curve fitting algorithms to apply the correlation such that the mass flow of the process gas is accurate and linear.

This thermal mass flow sensor is constructed by applying heated coils to a capillary tube. The coil material and method of construction are chosen such that the sensor will function as a resistance temperature device or RTD. In an RTD process sensor, a change in resistance maybe proportional to a change in temperature. The heater coils complete an electronic circuit which is designed to precisely excite or energize the coils as well as detect changes in the resistance of the coils. One embodiment of a thermal mass flow sensor has two coils, upstream and downstream. Mass flow through the capillary tube will transfer heat from the upstream coil to the downstream coil as a function of the heat capacity of the gas species flowing through the capillary tube. The downstream coil resistance will change in proportion to the mass flow of the gas species source connected to the inlet fitting of the mass flow controller.

However, MFCs of this type, and their control algorithms, may be particularly sensitive to pressure fluctuation in the process gases and may indicate false flow conditions. Upstream pressure disturbances are caused by the transient stability of discrete pressure regulators located upstream of the MFC inlet fitting or perturbations in the upstream pressure source. False flow conditions occur when a pressure gradient exists within the volume of the MFC fluid path, specifically in the volume that exist downstream of the thermal sensor and upstream of the control valve. Both types of disturbances are a function of the capacity of the gas source, impedance or conductance of the gas delivery system and abrupt transitions in gas flow.

Unfortunately, typical techniques for enhancing the bandwidth of the thermal sensor employed by MFCs inject high frequency components into the indicated flow signal that do not reflect the true value of the actual mass flow exiting the outlet fitting of the mass flow controller during upstream pressure disturbances. The magnitude of the temporary error in flow indication is a function of the volume in the flow path that is downstream of the thermal flow sensor and upstream of the control valve associated with the MFC. The compensated thermal sensor output measures mass flow upstream of the control valve. The real-time position of the throttling control valve is computed by the closed loop control algorithm executed by the control system. As the pressure in this volume changes, the compensated output of the thermal sensor changes. The control system reacts to a change in sensed mass flow by throttling the valve to reduce the error between the setpoint value and the indicated flow value to zero. An error term equivalent to zero assumes that the mass flow rate of actual process gas flowing into the inlet fitting is equivalent to actual process gas flowing from the outlet fitting. This temporary perturbation in indicated flow and actual process gas flow can result in poor transient or steady state stability that can cause wafer damage, tool alarms or unscheduled downtime.

Thus, there is a need for systems and methods for a mass flow controller which minimize false flow conditions and display a reduced sensitivity to pressure transients.

SUMMARY OF THE INVENTION

Systems and methods for mass flow controllers which minimize false flow conditions and display a reduced sensitivity to pressure transients are disclosed. These mass flow controllers may be utilized to stabilize the flow of process gases through a gas stick during upstream pressure disturbances as well as provide an indicated flow signal that more accurately reflects the movement of process gas flowing from the outlet fitting of a mass flow controller. Mass flow controllers of this type may also be utilized to reduce the number of components on a typical gas stick. Reduced sensitivity to pressure transients may be achieved by minimizing the pressure gradients that exists within the volume of the mass flow controller fluid path in order to limit the potential energy contained in compressed or pressurized process gas. Additionally, sensitivity of a mass flow controller to pressure transients may be accomplished by monitoring process gas pressure using a pressure sensor. This pressure signal is utilized in conjunction with a control algorithm to reduce the sensitivity of the mass flow controller during pressure disturbances by canceling the detrimental effect of certain flow components. These mass flow controllers may be used as drop in replacements for legacy mass flow controllers and reduce the cost of gas sticks due to elimination of discrete components such as pressure regulators, gas filters, pressure transducers, local pressure displays, isolation valves, seals, etc.

In one embodiment, a set of conditions are sensed, a mass flow in the mass flow controller is calculated based on one or more of the set of conditions, an error term based on the mass flow, a setpoint and one or more of the set of conditions is calculated, the mass flow controller can then be adjusted based on the error term.

In another embodiment, one of the set of conditions is pressure, and the error term is calculated based on the pressure.

In still another embodiment, the pressure is sensed by a pressure sensor located upstream of a mass flow sensor.

In yet another embodiment, the error term is calculated based on a scaled derivative of the pressure.

In other embodiments, the scaling of the scaled derivative is determined during calibration of the mass flow controller.

In some embodiments, the mass flow controller is adjusted using a control valve.

In still other embodiments, the error term is used to generate a drive signal for the control valve.

In one embodiment a system comprises a mass flow controller, including an inlet, an outlet, a flow path coupled to the inlet and the outlet, a flow sensor coupled to the flow path, a control valve downstream of the flow sensor and upstream of the outlet, wherein a volume of the flow path downstream of the flow sensor and upstream of the control valve is optimized.

In similar embodiments, the control valve is positioned vertically and the optimization minimizes the volume.

In some embodiments, the system further comprises a pressure sensor coupled to the flow path downstream of the inlet and upstream of the flow sensor operable to sense the pressure downstream of the inlet and upstream of the flow sensor.

In another embodiment, the system comprise a control system operable to receive a set of conditions, calculate a mass flow in the mass flow controller based on one or more of the set of conditions, calculate an error term based on the mass flow, a setpoint and one or more of the set of conditions and adjust the mass flow controller based on the error term.

In one embodiment, a gas stick comprises a pressure sensor coupled to the gas stick and a mass flow controller coupled to the gas stick, including an inlet coupled to the gas stick, an outlet coupled to the gas stick, a flow path coupled to the inlet and the outlet, a flow sensor coupled to the flow path and a control valve downstream of the flow sensor and upstream of the outlet These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 represents a persistent upstream perturbation test where inlet pressure is varied utilizing 45 PSIA nominal and 5 PSID peak to peak.

FIG. 2 represents an upstream crosstalk disturbance test utilizing 30 PSIA nominal and 2 PSID decay and recovery.

FIG. 10 depicts the response of a mass flow controller to a test of the type depicted in FIG. 2

FIG. 11 depicts the response of a mass flow controller to a test of the type depicted in FIG. 1.

DESCRIPTION OF PREFERRED EMBODIMENTS

Figure 3:
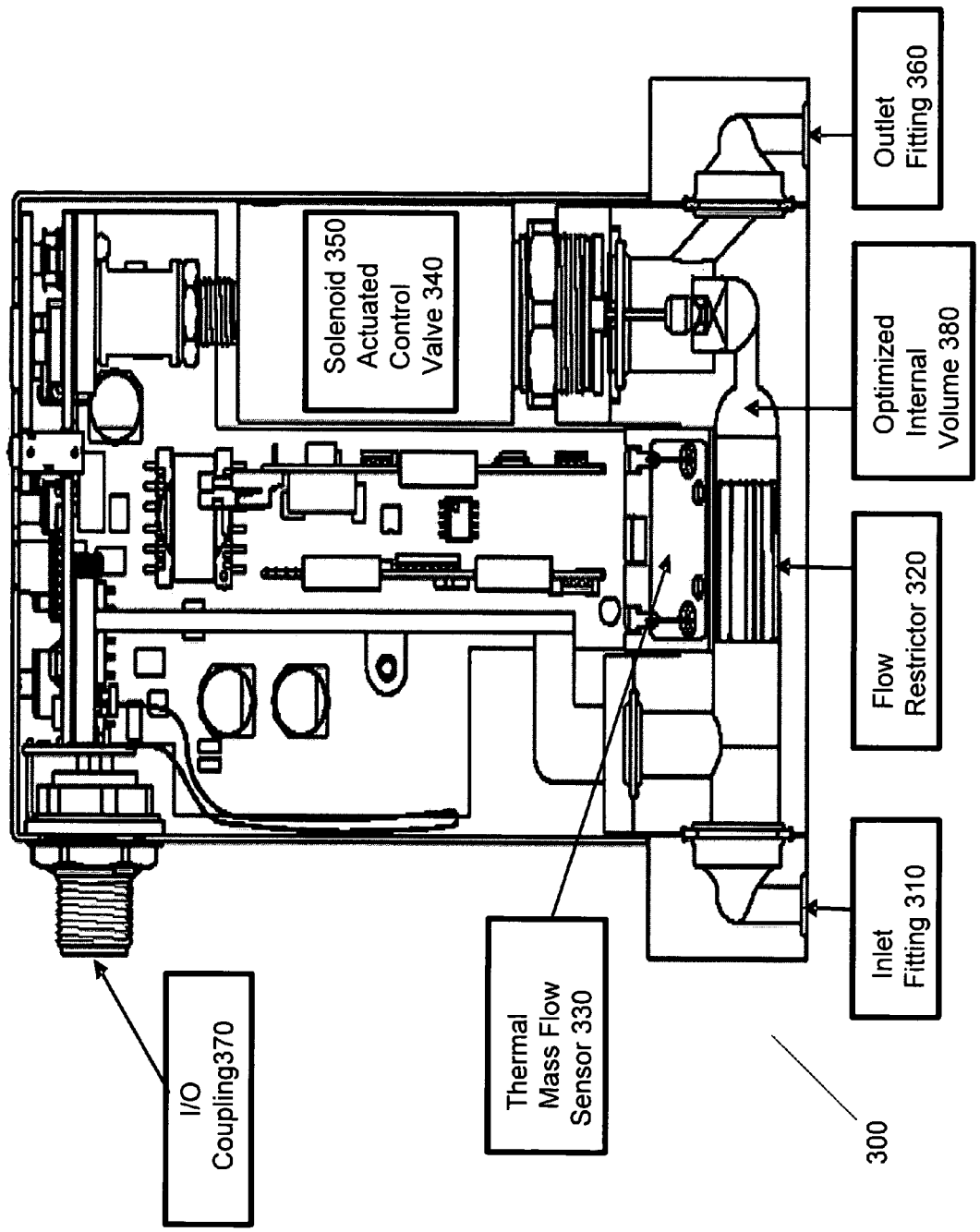
FIG. 3 includes an illustration of one embodiment of a mass flow controller design that enables reduced sensitivity to pressure changes.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements which do not depart from the scope of the appended claims will become apparent to those skilled in the art from this disclosure.

Before describing embodiments of the present invention, two types of pressure disturbance test which may be utilized to measure the efficacy of a mass flow controller's response to these pressure variations in a gas flow are presented. FIG. 1 represents a persistent perturbation test where inlet pressure is varied utilizing 45 PSIA nominal and 5 PSID peak to peak. FIG. 2 represents a crosstalk disturbance test utilizing 30 PSIA nominal and 2 PSID decay and recovery. The response of a mass flow controller and its control system to each of these tests may be observed by measuring the solenoid valve drive signal input to the mass flow controller in response to these pressure disturbances, the actual gas flow measurement from the mass flow controller, the indicated flow signal output by the mass flow controller and the actual pressure at the inlet of the mass flow controller. The tests described with respect to FIG. 1 and FIG. 2 will be utilized in conjunction with embodiments of the present invention to display the efficacy of these embodiments in handling pressure transients in the flow of gas.

Attention is now directed to systems and methods for flow controllers which minimize false flow conditions and display a reduced sensitivity to pressure transients. These flow controllers may be utilized to stabilize the flow of process gases through a gas stick during upstream pressure disturbances as well as provide an indicated flow signal that more accurately reflects the movement of process gas flowing from the outlet fitting of a mass flow controller. Flow controllers of this type may also be utilized to reduce the number of components on a typical gas stick.

These systems and methods may allow a flow controller to exhibit reduced sensitivity to pressure transients by minimizing the pressure gradients that exists within the volume of the mass flow controller fluid path in order to limit the potential energy contained in compressed or pressurized process gas.

These systems and methods may also reduce the sensitivity of a flow controller to pressure transients by monitoring process gas pressure using a pressure sensor. This pressure signal is utilized in conjunction with a control algorithm to reduce the sensitivity of the mass flow controller during pressure disturbances by canceling the detrimental effect of certain flow components.

These flow controllers may be used as drop in replacements for legacy flow controllers, reduce the cost of gas sticks due to elimination of discrete components such as pressure regulators, gas filters, pressure sensors (transducers), local pressure displays, isolation valves, seals, etc., and improve the safety and reliability of manufacturing processes while simultaneously reducing the cost and increasing the yield due to a reduction in the discrete components utilized in the process.

Turning now to FIG. 3, one embodiment of a flow controller exhibiting reduced sensitivity to pressure changes is depicted. Flow controller 300 may function as a mass flow controller and comprise inlet fitting 310, flow restrictor 320, mass flow sensor 330, control valve 340, solenoid 350, outlet fitting 360 and I/O coupling 370 for communicating with a control system or process management system.

Gas enters mass flow controller 300 through inlet fitting 310 flows through flow restrictor 320, control valve 340 and outlet fitting 360. The volume of gas flowing through outlet fitting 360 is controlled by control valve 340, which is in turn controlled by solenoid 350.

Solenoid 350 opens and closes control valve 340 based on signals received through I/O coupling 370 to regulate the flow through outlet fitting 360. In one embodiment, solenoid 350 actuates a diaphragm isolated throttling ball-seat valve. Electrical current is applied to solenoid 350 which produces magnetic flux that is coupled to a plunger assembly or armature which displaces the ball from the valve seat. The force generated by the solenoid valve works against the force or resistance inherent in the isolation diaphragm and the auxiliary or preload force. A preload force may be applied axially to the ball to ensure a concentric seal with the valve seat such that the value of valve leak through is within a certain tolerance.

Mass flow sensor 330 and solenoid 350 may be coupled to a control system. Flow sensor 330 may be coupled to the control system by utilizing an analog to digital converter. The control system monitors the setpoint input, and output of flow sensor 330, while refreshing the control valve drive signal and indicated flow output. The closed loop control algorithms executed by the control system operate to regulate the mass flow of process gas sourced at inlet fitting 310 through control valve 340 and outlet fitting 360 such that the real-time difference or error between the setpoint input and indicated flow output is zero or null as fast as possible with minimal overshoot and as small a control time as possible. A critically damped response characteristic is desired. Furthermore, the difference between the mass flowing into inlet fitting 310 is desired to be equivalent to the mass flowing from outlet fitting 360.

Mass flow sensor 330 is coupled to the flow path of mass flow controller 300 using a bypass arrangement along a partial restriction in the flow path that ensures laminar flow in the flow measurement portion of the mass flow controller 300. The sensor 330 samples only a portion of gas that flows from inlet fitting 310 through control valve 340 and from outlet fitting 360. A calibration and validation process may be applied to the completed mass flow controller assembly 300 to correlate the digitized value of sampled gas flow to a primary mass flow standard. The control system may then execute programmable curve fitting algorithms to apply the correlation such that the mass flow of the process gas is accurate and linear within the published performance claims.

In one embodiment, mass flow sensor 330 is a thermal mass flow sensor and is constructed by applying at least two heated coils to a capillary tube. The coil material and method of construction are chosen such that the sensor will function as a resistance temperature device or RTD. In an RTD type of sensor, a change in resistance is proportional to a change in temperature. The heater coils complete an electronic circuit which is designed to precisely excite or energize the coils as well as detect changes in the resistance of the coils. One embodiment of a thermal mass flow sensor has two coils, upstream and downstream. Mass flow through the capillary tube will transfer heat from the upstream coil to the downstream coil as a function of the heat capacity of the gas species flowing through the capillary tube. The downstream coil resistance will change in proportion to the mass flow of the gas species source connected to inlet fitting 310 of mass flow controller 300.

In some cases, the uncompensated real-time output of thermal mass flow sensor 330, F(t), may be ill-suited for real-time closed loop control due to its' natural time constant or bandwidth. The time domain transfer function approximation of thermal sensor 330 to a unit step input function, u(t), is $F(t)=K*(1-e^{-t/\tau} \ldots$ where $\tau$ is the $1^{st}$ order time constant of the exponential based approximation and K is a constant based upon the design and construction of the thermal sensor. This approximation may not include the higher order time constants, non-linearities, fluid transportation lags and the dead-time that exist in the actual embodiment. However, the $1^{st}$ order model may be sufficient for modeling the behavior of this system. The $1^{st}$ order time constant of the Tylan small bore thermal sensor may be approximately 1.7 seconds for N2 gas when biased with an excitation current of ~10.8 mA and a bypass split ratio which produces a full scale sensor flow of ~2 to 3 sccm. The value of $\tau$ varies for different gases and flow rates, as is known in the art. One method of enhancing the bandwidth of the thermal flow sensor is to add a weighted amount of the $1^{st}$ derivative of the thermal sensor output to the real-time thermal sensor output. The $1^{st}$ derivative of F(t) is $dF(t)/dt = (1/\tau \ldots *e^{-t/\tau}$. Indicated Flow=$F(t)+G*dF(t)/dt$, where G=the gain or weight of the derivative of F(t). Setting G=$\tau$ may yield an indicated flow value of 1 or unity which matches the input function, u(t). Theoretically, this allows for real-time metering of the actual flow. This scenario is the mathematical basis for enhancing the thermal sensor signal bandwidth to obtain near real-time mass flow metering and feedback to the closed loop control system. The value of $\tau$ may be uniquely tuned or chosen for each flow controller to achieve reproducible and uniform transient response performance. The control system uses sampled data and difference equations to numerically construct the derivative function for the purpose of enhancing the natural bandwidth of the thermal sensor. For example, one proven method is to compute the derivative value over a time period of ~20 mS. This technique provides a sufficient amount of signal to effectively enhance the thermal sensor natural bandwidth.

Therefore, $dF(t)/dt \mid_{t=kT}=(nT)^{-1}*[f(kT)-f((k-n)*T)]$, where k=most recent sample, T=sampling frequency=500 uS, and n=40 to yield a dt=20 mS.

Figure 4:
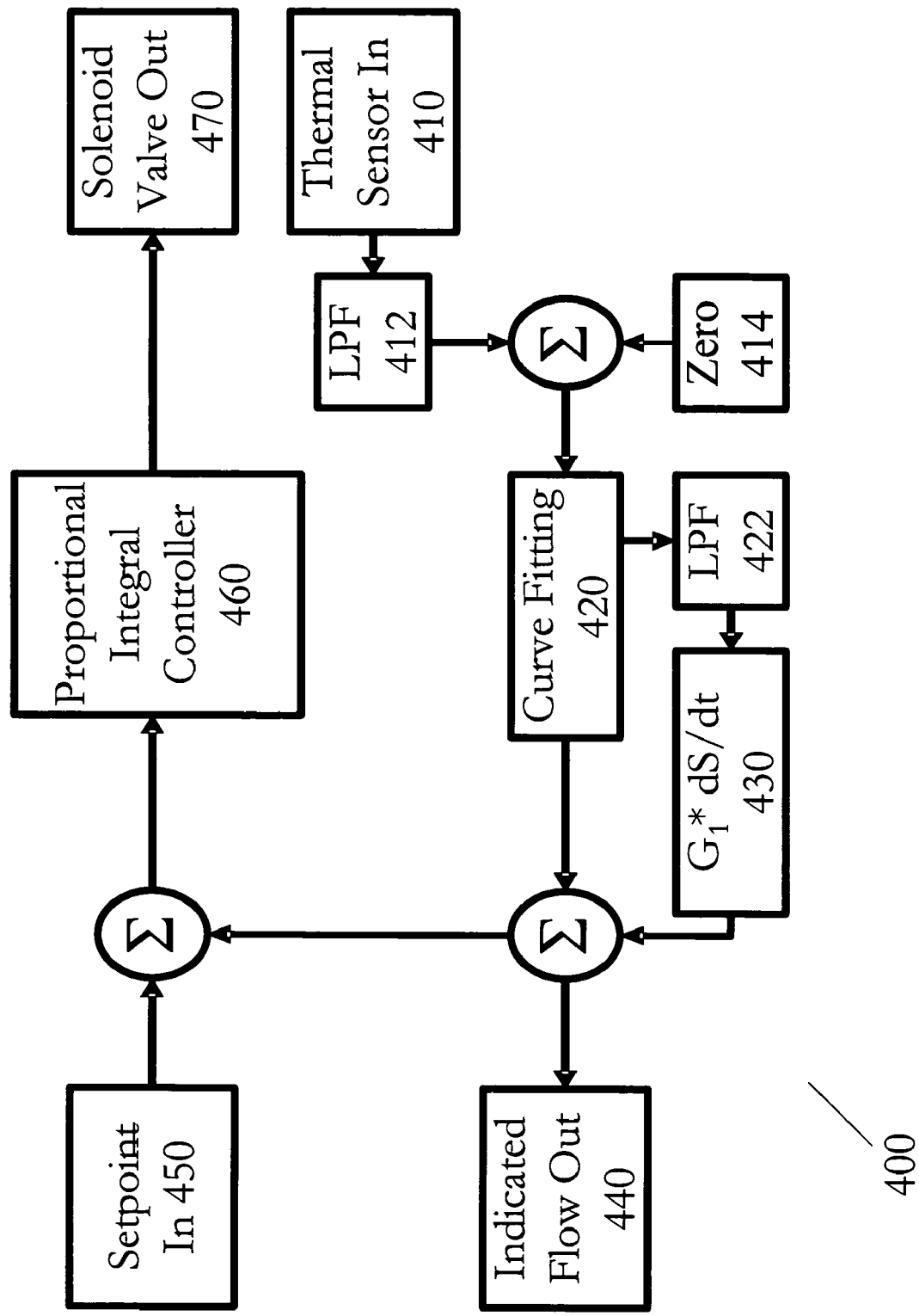
FIG. 4 includes a block diagram of a control system for use with a mass flow controller.

Moving briefly to FIG. 4, a block diagram for one embodiment of a control system which may be utilized in conjunction with mass flow controller 300 is depicted. Control system 400 may utilize a closed loop control algorithm which receives input 410 from thermal mass flow sensor 330 corresponding to the perceived mass flow of a gas through the capillary tube to which mass flow sensor 300 is coupled. This signal may then be passed through a low pass filter (LPF) 412 and compared with zero value 414 assigned to the zero or natural offset of thermal mass flow sensor 330. The zero value 414, or natural offset, is the value that thermal sensor 330 outputs after it has been properly warmed-up and during a no mass flow condition.

This signal may then be fit to a stored curve by curve fitting algorithm 420 to correlate the value of sampled flow gas to a primary mass flow standard. These correlation curves may be determined in the field during a recalibration process or during a calibration and validation process for mass flow controller 300 during which observed sample gas flow through mass flow controller 300 is correlated with a primary mass flow standard. This correlation may then be applied by curve fitting algorithm 420 to generate an enhance flow rate signal.

After the signal is fitted to a curve the resulting enhanced signal may be passed through LPF 422, and combined with one or more scaled derivatives 430 of the enhanced flow rate signal, which may include scaled first or second derivatives of enhanced flow rate signal, to produce flow rate signal 440 that more accurately represents flow rate through mass flow controller 300. This flow rate signal may then be compared to setpoint signal 450 to create an error signal, which may in turn be provided to proportional integral controller 460 to generate solenoid control signal 470 for mass flow controller 300.

Returning now to FIG. 3, mass flow controller 300 may receive solenoid drive signal 470 from control system 400. Based on solenoid drive signal 370, solenoid 350 may actuate control valve 340 to increase or reduce the flow of gas through outlet fitting 360 of mass flow controller 300.

Occasionally, however, when enhancing the bandwidth of thermal sensor 330 the weighted rate of change component injects high frequency components into the indicated flow signal that do not reflect the true value of the actual mass flow exiting outlet fitting 360 of mass flow controller 300 during upstream pressure disturbances. The magnitude of the temporary error in flow indication may be proportional to the volume in the flow path that is downstream of thermal flow sensor 330 and upstream of control valve 340. The compensated thermal sensor output measures mass flow upstream of control valve 340. The real-time position of control valve 340 is computed by a closed loop control algorithm executed by control system 400. As the pressure in this volume changes, the compensated output of thermal sensor 330 changes. Control system 400 reacts to a change in sensed mass flow by throttling control valve 340 (through solenoid drive signal 470) to reduce the error, (e.g. setpoint value−indicated flow value), to zero. An error term equivalent to zero assumes that the mass flow rate of actual process gas flowing into inlet fitting 310 is equivalent to actual process gas flowing from outlet fitting 360. Consequently, a temporary perturbation in indicated flow or actual process gas flow can result in poor transient or steady state stability that can cause wafer damage, tool alarms or unscheduled downtime.

Upstream pressure disturbances may be caused by the transient stability of discrete pressure regulators located upstream of inlet fitting 310 or perturbations in the upstream pressure source. Both these types of disturbances are a function of the capacity of the gas source, impedance or conductance of the gas delivery system and abrupt transitions in gas flow. Additionally, pressure disturbances of a specific bandwidth may change the pneumatic gain of control valve 340 at a rate outside of the natural bandwidth of thermal sensor 330. During upstream pressure disturbance events the estimation or bandwidth enhancement portion of the compensated thermal sensor output value exceeds the actual value of the process gas flow exiting outlet fitting 360 such that mass flow regulation is momentarily destabilized.

These false flow conditions may occur when pressure gradients exist within the volume of the fluid path of mass flow controller 300, and are exacerbated when these pressure gradients exist within the internal volume 380 of the fluid path that exists downstream of thermal sensor 330 and upstream of control valve 340. In one embodiment, internal volume 380 of fluid path of mass flow controller 300 is optimized to limit the potential energy contained in compressed or pressurized gas flowing through the fluid path. This optimization may include minimization of internal volume 380 of the fluid path downstream of thermal sensor 330 and upstream of control valve 340. A smaller internal volume 380 may also limit the amount of gas flowing through the fluid path that was not accurately metered or detected by thermal sensor 330 during a pressure disturbance.

One method of achieving optimization of this portion of fluid path is vertically orienting control valve 340 and solenoid 350 actuating control valve 340, allowing the further optimization of internal volume 380 without regard for any volume of portion of fluid path occupied by control valve 340, actuating solenoid 350, or any mechanism by which solenoid 350 actuates control valve 340.

In some embodiments, optimization of internal volume 380 is achieved by designing the gas wetted flow path such that the volume downstream of thermal sensor 330 and upstream of control valve 340 is reduced versus conventional mass flow controllers.

A smaller internal volume 380 reduces the magnitude of potential differences in mass flowing into inlet fitting 310, and exiting outlet fitting 360 of mass flow controller 300. One well known form of the ideal gas law is:

$$P*V = n*R*T \text{ or } n = (P*V)/(R_o*T), \text{ where}$$

n=number of moles or a quantity of gas=m/M, where m=mass of gas species and M=molecular weight of gas species P=pressure of gas species V=volume containing the gas species R=specific gas constant T=temperature of gas species Thus, the quantity of gas in a volume is smaller if the volume is smaller, and the quantity of gas in a volume varies with the pressure. Changes in pressure upstream of mass flow controller 300 cause a proportional change in pressure in internal volume 380. The rise or fall of pressure in the internal volume 380 has a time constant which is a function of the upstream pressure, mass flow rate and magnitude of the internal volume 380. The time constant may be given as:

$$\tau_c = V/Q, \text{ where}$$

V=magnitude of optimized internal volume

Q=mass flow rate into or out of internal volume

K=constant or function for given application

The time constant is smaller as the magnitude of volume 380 is reduced or as the magnitude of the mass flow rate is increased. The magnitude of the rate of change of the pressure in internal volume 380 is a function of the time constant as described above and can be approximated with a first order exponential function:

$$\Delta P(t)/\Delta t = G2 * e^{(-t/\tau_c)}, \text{ where}$$

G2=f(mass flow rate, upstream pressure, mass of gas species, molecular weight of gas species, gas temperature, internal volume)

G2 can be embodied as a constant value across the operating range of mass flow controller 300 or as a function of a setpoint value. G2 can be chosen based upon empirical data in the test setup during calibration of mass flow controller 300.

Another advantage of optimizing internal volume 380 may be improving the effective signal to noise ratio of the PI compensation component 901 in the error term of the control system of mass flow controller 300 (discussed below). A smaller time constant due to the small magnitude of optimized internal volume 380 produces a larger rate of pressure change signal for a given upstream pressure change. This feature provides significant advantage and flexibility as the rate of pressure change signal does not have to be delayed nor filtered in a manner that inhibits the ability to choose a suitable value of G2 to desensitize the system to upstream pressure changes. Increased signal to noise ratio of the rate of pressure change signal also enables lower effective values of G2 which does not adversely enhance the noise inherent in a pressure sensor output.

Figure 5:
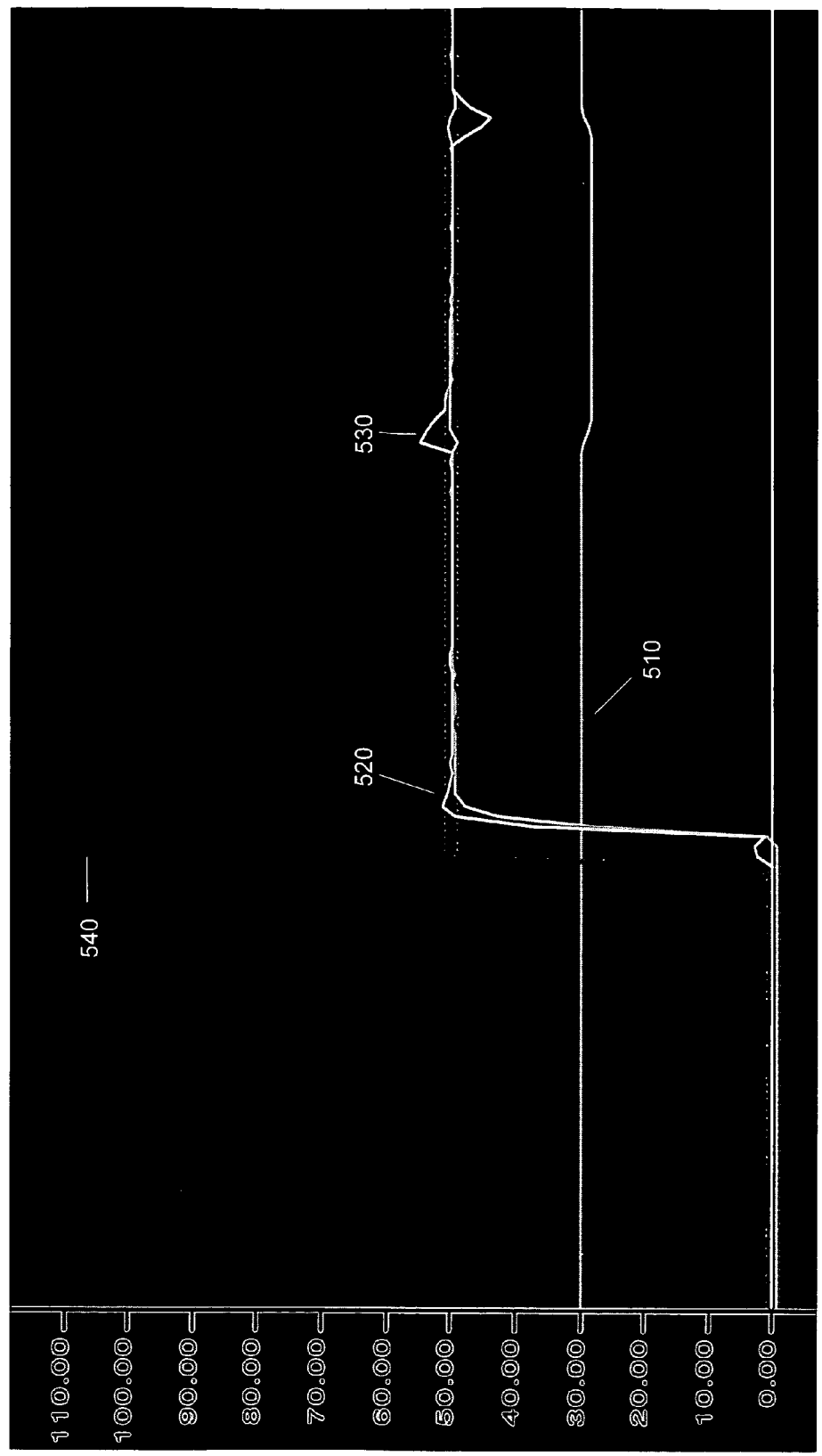
FIG. 5 depicts the response of a mass flow controller to a test of the type depicted in FIG. 2.

FIG. 5 depicts the response of mass flow controller 300 to a test of the type depicted in FIG. 2. Line 510 is inlet pressure measurement, line 520 is an indicated flow signal, line 530 is an actual measurement of gas flow, while line 540 represents the solenoid valve drive signal 470 output from control system 400. As inlet pressure 510 drops actual gas flow 530 momentarily spikes while indicated flow signal 520 drops slightly, the opposite occurs when inlet pressure 510 returns to 30.00 PSIA nominal.

Figure 6:
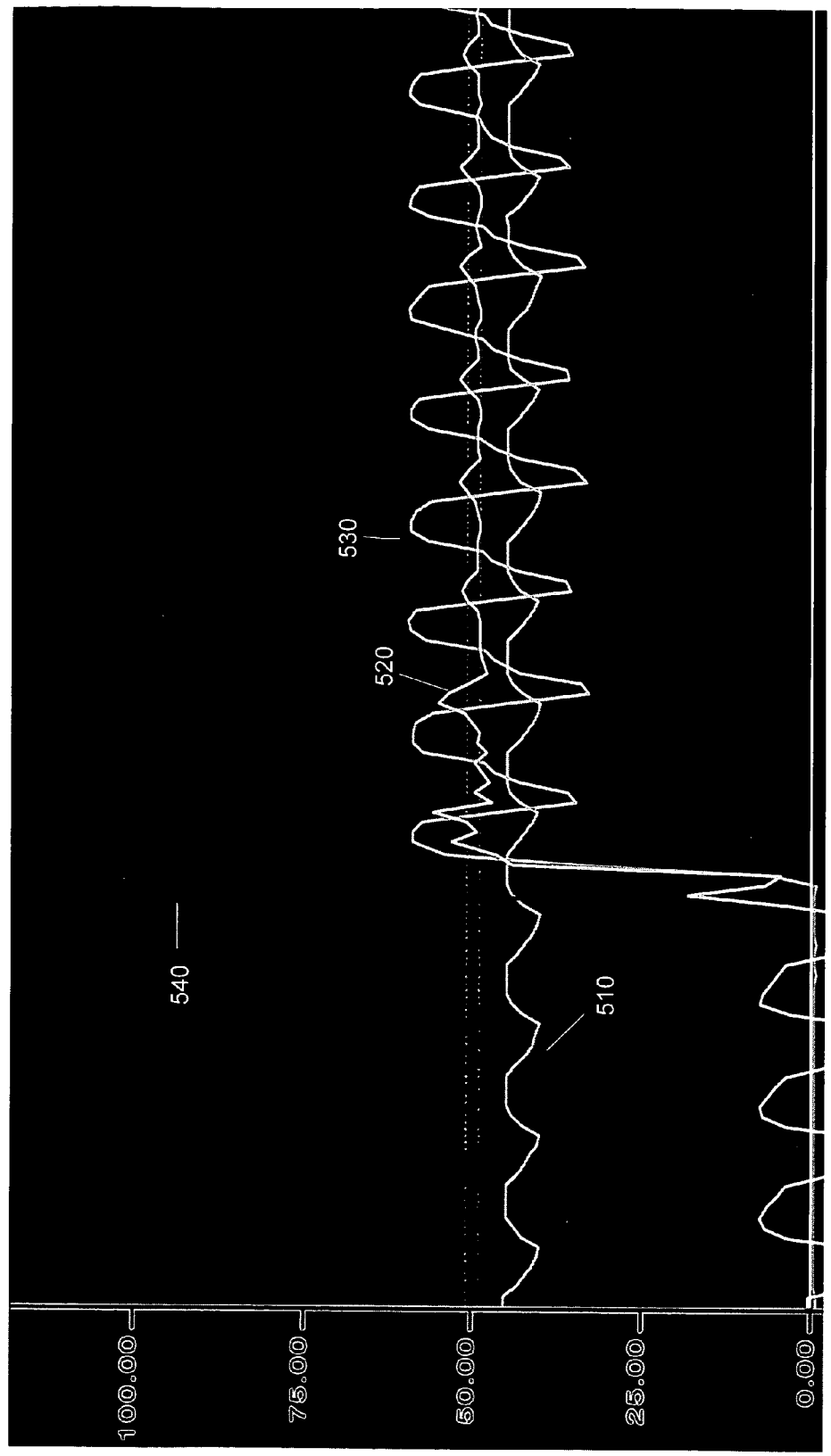
FIG. 6 depicts the response of a mass flow controller to a test of the type depicted in FIG. 1.

FIG. 6 depicts the response of mass flow controller 300 to a test of the type depicted in FIG. 1. As can be seen, as inlet pressure 510 fluctuates, actual gas flow 530 may ping pong, causing perturbations within indicated flow signal 520 and consequently making regulation of actual flow 530 through valve drive signal 540 difficult.

Figure 7:
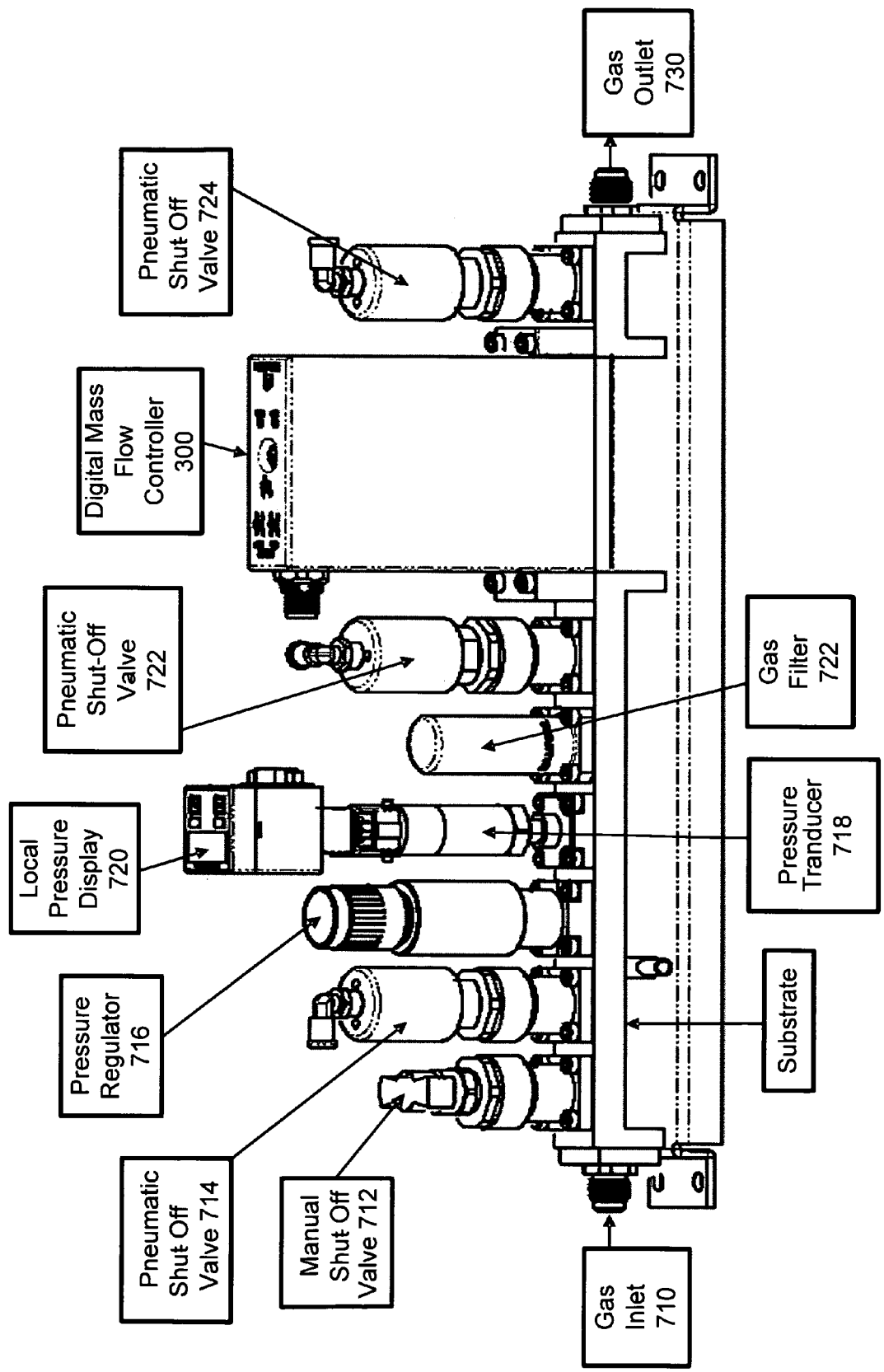
FIG. 7 includes one embodiment of a gas stick.

FIG. 7 depicts a gas stick utilizing mass flow controller 300. Gas enters through gas inlet 710 flows through manual shut-off valve 712, pneumatic shut off valve 714, pressure regulator 716, pressure transducer 718 (local pressure display 720 may display the pressure measured by pressure transducer 718), gas filter 722, pneumatic shut-off valve 724, mass flow controller 300, pneumatic shut-off valve 726, finally exiting gas outlet 730. Mass flow controller 300 may be coupled to control system through I/O coupling 370 in order to regulate gas flow through gas stick 700.

Figure 8:
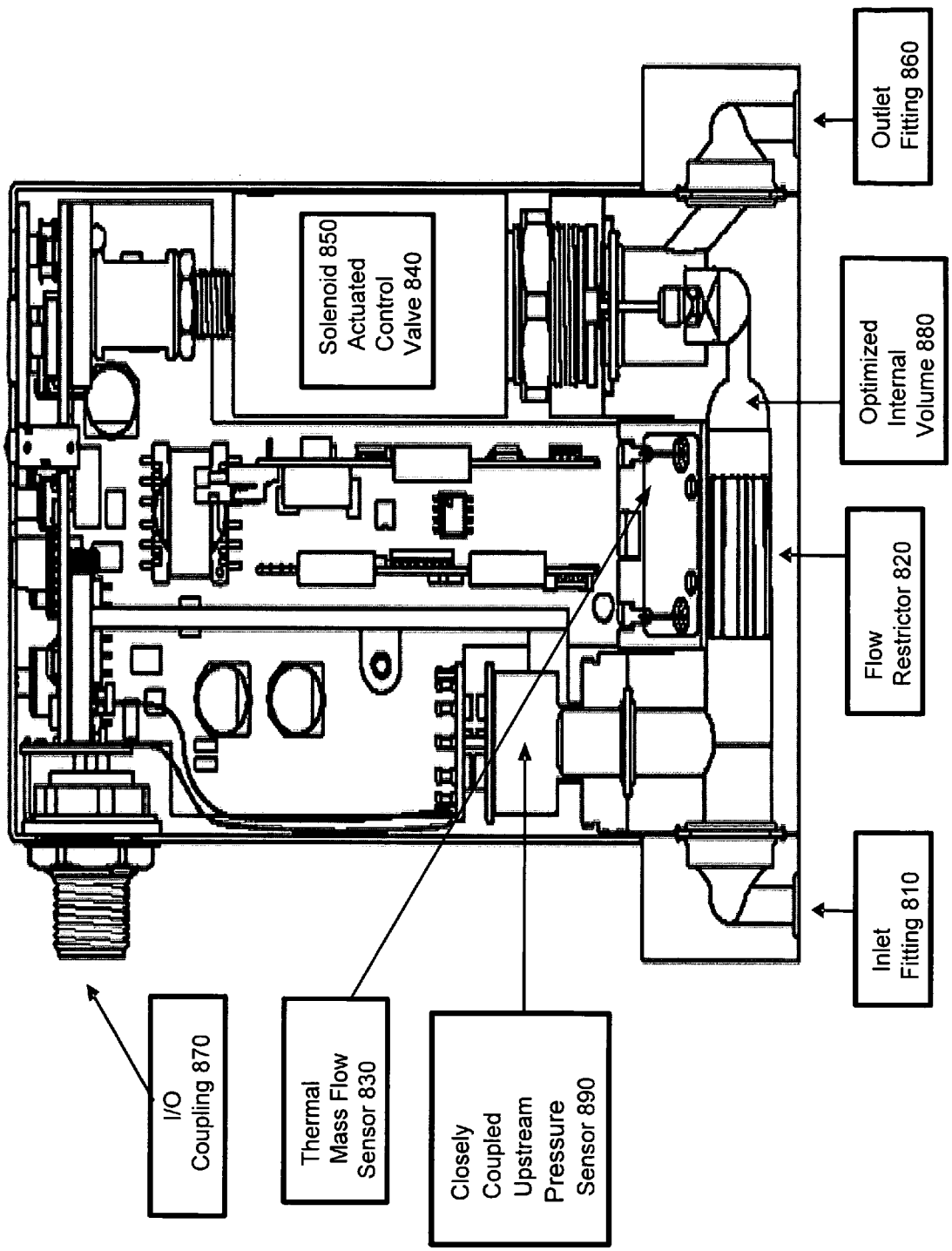
FIG. 8 includes an illustration of one embodiment of a mass flow controller design that enables reduced sensitivity to pressure changes.

Turning now to FIG. 8, another embodiment of a mass flow controller exhibiting reduced sensitivity to pressure changes is depicted. Mass flow controller 800 comprises inlet fitting 810, flow restrictor 820, mass flow sensor 830, control valve 840, solenoid 850, outlet fitting 860, pressure sensor 890 and I/O coupling 870 for communicating with a control system or process management system.

Mass flow sensor 830, control valve 840 and solenoid 850 may function in substantially the same manner as described with respect to mass flow sensor 300 depicted in FIG. 3. Additionally, in one embodiment, internal volume 880 of the flow path is also optimized to reduce pressure gradients as discussed above with respect to mass flow controller 300. Pressure sensor 890 may monitor process gas pressure and report a pressure signal through I/O coupling 870 to a control system.

Pressure sensor 890 may be located anywhere upstream of flow restrictor 820 and monitor the pressure of a process gas to produce a pressure signal to a control system. In one embodiment, pressure sensor 890 is coupled to the fluid path of mass flow controller 800 downstream of inlet fitting 810 and upstream of flow restrictor 820. Pressure sensor 890 may monitor the process gas pressure downstream of inlet fitting 810 and upstream of thermal sensor 830. Pressure sensor 890 produces a pressure signal which may be quantized by a standard 16 bit analog to digital converter and reported through I/O coupling 870 to a control system along with the output of thermal mass flow sensor 830. In one specific embodiment, pressure sensor 890 is a SolidSense II pressure sensor with an integrated pressure fitting manufactured by the Mykrolis Corporation.

Figure 9:
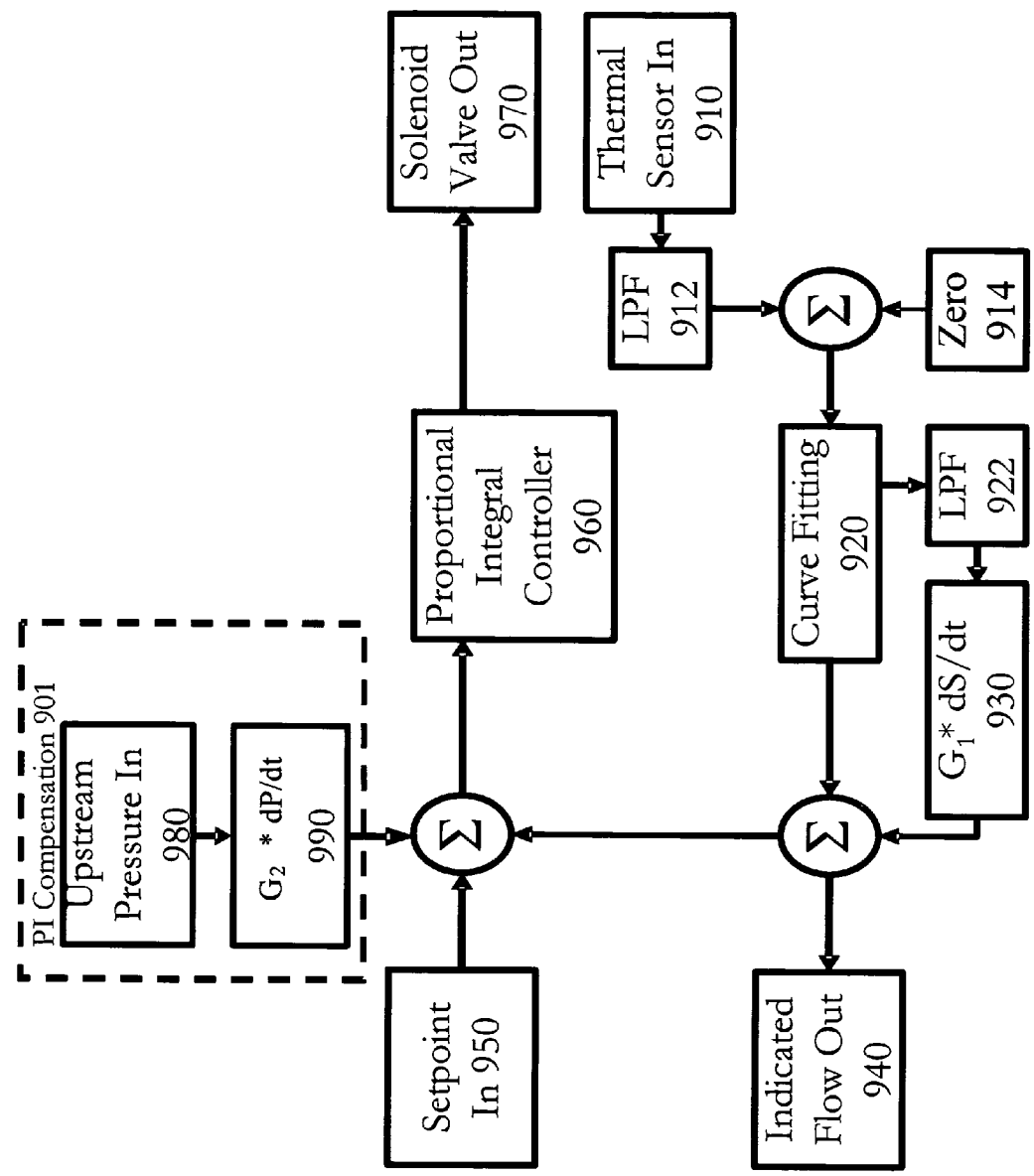
FIG. 9 includes a block diagram of a control system for use with a mass flow controller and pressure sensor.

FIG. 9 depicts a block diagram of one embodiment of a control system for use in conjunction with mass flow controller 800 depicted in FIG. 8. Control system 900 may execute a closed loop control algorithm which operates to achieve mass flow control exhibiting reduced sensitivity to upstream pressure disturbances by canceling the detrimental effect of the higher frequency indicated flow components. The effect of these high frequency components adversely impacts the transient response or steady state stability of the mass flow controller.

Control system 900 may utilize a closed loop control algorithm which receives input 910 from thermal mass flow sensor 930 corresponding to the perceived mass flow of a gas through the capillary tube to which thermal mass flow sensor 830 is coupled. This signal may then be passed through LPF 912 and summed with and compared with zero value 914 assigned to the zero or natural offset of thermal mass flow sensor 830. The zero value 914, or natural offset, is the value that thermal sensor 830 outputs after it has been properly warmed-up and during a no mass flow condition.

This signal may then be fit to a stored curve by a curve fitting algorithm 920 to correlate the value of the sampled flow gas to a primary mass flow standard. These correlation curves may be determined during a recalibration or calibration and validation process for mass flow controller as described above. This correlation may then be applied by curve fitting algorithm 920 to generate an enhance flow rate signal.

After the signal is fitted to a curve the resulting enhanced signal may be passed through a LPF 922, and combined with one or more scaled derivatives 930 of the enhanced flow rate signal, which may include scaled first or second derivatives of the enhanced flow rate signal to produce a flow rate signal that more accurately represents flow rate through mass flow controller 800.

Additionally, control system 900 may receive a signal 980 corresponding to the upstream pressure of mass flow controller 800 from pressure sensor 890. Control system 900 may then create a term that is proportional to the rate of change of upstream pressure using a scaled derivative 990 of the pressure signal 980 from pressure sensor 890. In one particular embodiment, during the recalibration, manufacture or configuration process of mass flow controller 800 or control system 900 a specific scaling of the dP/dt value is chosen such that it cancels the high frequency components of a compensated thermal sensor output that is due to upstream pressure disturbances and provides for a real-time control valve 840 position that enables the mass flow rate of process gas flowing into inlet fitting 810 to be substantially equivalent to the mass flow of process gas exiting outlet fitting 860.

The scaling (G2) of scaled derivative 990 may be a function of gas species, upstream pressure, real-time mass flow rate of gas flowing through or into mass flow controller 800, internal volume in mass flow controller 800 and gas temperature. Additionally, the scaling may contribute a component to the real-time error (setpoint (t)−indicated flow (t)+G2*ΔP(t)/Δt) in mass flow controller 800 that actively and accurately cancels either undesired accumulation or undesired reduction of mass in optimized internal volume 880 due to upstream pressure transients sensed by closely coupled upstream pressure sensor 890. The accumulation or reduction of mass in optimized internal volume 880 is undesired when the mass flow rate entering inlet fitting 810 is not equal to the mass flow rate exiting outlet fitting 360.

Scaled derivative 990 of pressure signal 980 may then be compared with setpoint value 950, and indicated flow rate 940 to generate an error signal. In one particular embodiment this error signal may be represented by setpoint value−indicated flow value+G2*dP/dt Value.

This error term may then be input to variable gain proportional integral controller 960. The output of proportional integral controller is compared with the current bias of control valve 840 and the result input to a solenoid valve driver circuit to generate a solenoid drive signal 970. Therefore, the position of control valve 840 of mass flow controller may now be function of the setpoint, the compensated thermal mass flow output and upstream pressure transients. It should be noted that in this embodiment of control system 900 for achieving immunity to upstream pressure transients the error term may be identical to the error term of control system 400 depicted in FIG. 4 when the upstream pressure at the inlet of mass flow controller 800 is constant. This characteristic enables mass flow controller 800 to be a drop in replacement to legacy mass flow controllers while providing an incremental improvement in wafer yields and tool uptime.

FIGS. 10 and 11 depict the performance of mass flow controller 900 containing pressure sensor 890. FIG. 10 depicts the response of mass flow controller 800 to a test of the type depicted in FIG. 2 depending on the scaling of derivative 990 of pressure signal 980. Line 510 is inlet pressure measurement, line 520 is an indicated flow signal, line 530 represents an actual measurement of gas flow, while line 540 represents the solenoid valve drive signal 970 output from control system 900.

When the scaling of derivative 990 is optimized during a calibration process, as shown in FIG. 10A, as inlet pressure 510 drops actual gas flow 530 momentarily rises while indicated flow signal 520 drops slightly. The opposite occurs when inlet pressure 510 returns to 30.00 PSIA nominal. However, as can be seen, actual gas flow 530 remains substantially constant regardless of the fluctuations in the inlet pressure 510 of the gas.

If the scaling of derivative 990 is low there may be an initial overshoot of actual gas flow 530 when inlet pressure 510 drops and before inlet pressure 510 settles to a steady state as depicted in FIG. 10B. Conversely, there may be an undershoot when inlet pressure 510 rises and before inlet pressure 510 returns to a steady state. If the weighting of derivative is too high, as depicted in FIG. 10C, just he opposite may occur. An initial undershoot of actual gas flow 530 when inlet pressure 510 drops and before inlet pressure 510 settles to a steady state, and an overshoot when inlet pressure 510 rises and before inlet pressure 510 returns to a steady state.

FIG. 11 depicts the response of mass flow controller 800 to a test of the type depicted in FIG. 1, depending on the scaling of derivative 990 of pressure signal 980. When the scaling of derivative 990 is optimized during a calibration process, as shown in FIG. 11A, as inlet pressure fluctuates 510, actual gas flow 530 rises and falls turn. The amplitude of these fluctuations in actual gas flow is relatively slight, however, and the indicated flow signal remains relatively constant, allowing easier regulation of actual gas flow through valve drive signal. In contrast, when scaling of derivative 990 is low or high, as depicted in FIGS. 11B and C respectively, the fluctuations in actual gas flow in response to the perturbations in inlet pressure are much greater.

Figure 12:
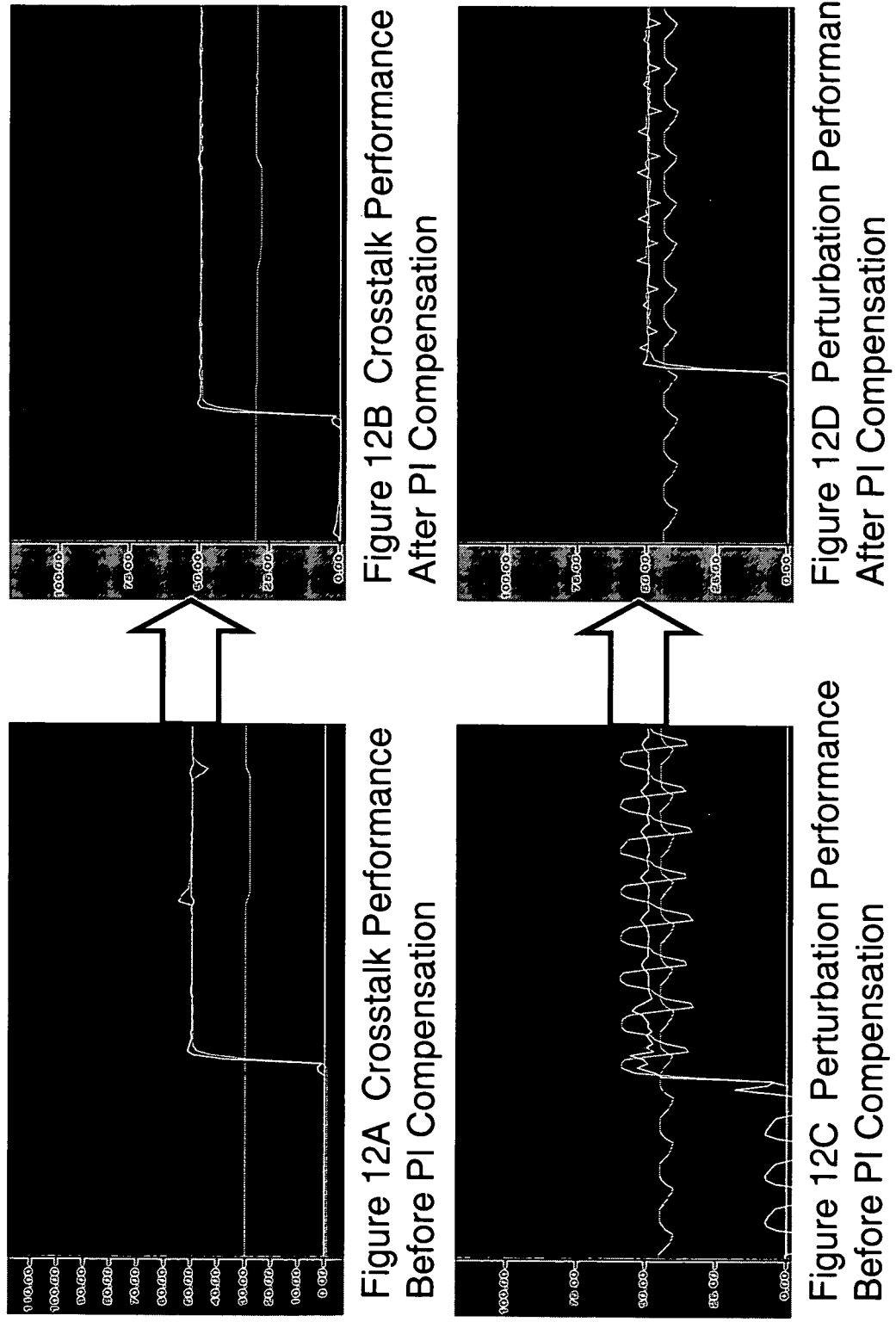
FIG. 12 depicts the relative performance of two embodiments of a mass flow controller.

Moving on to FIG. 12, the difference in performance between a mass flow controller which utilizes a pressure sensor to compensate for inlet pressure fluctuations and a mass flow controller which does not utilize a pressure sensor to compensate for these pressure fluctuations is illustrated. FIG. 12A depicts the performance of an embodiment of mass flow controller 300, discussed with respect to FIG. 3, to a test of the type depicted in FIG. 1. FIG. 12B depicts the performance of an embodiment of mass flow controller 800, discussed with respect to FIG. 8, to the same test. FIG. 12C depicts the performance of an embodiment of mass flow controller 300, to a test of the type depicted in FIG. 2. FIG. 12D depicts the performance of an embodiment of mass flow controller 800, to the same test. As can be seen from FIG. 12, mass flow controller 800 compensates significantly for upstream pressure fluctuations reducing the detrimental effects of these fluctuations and improving its transient response and steady state stability.

Figure 13:
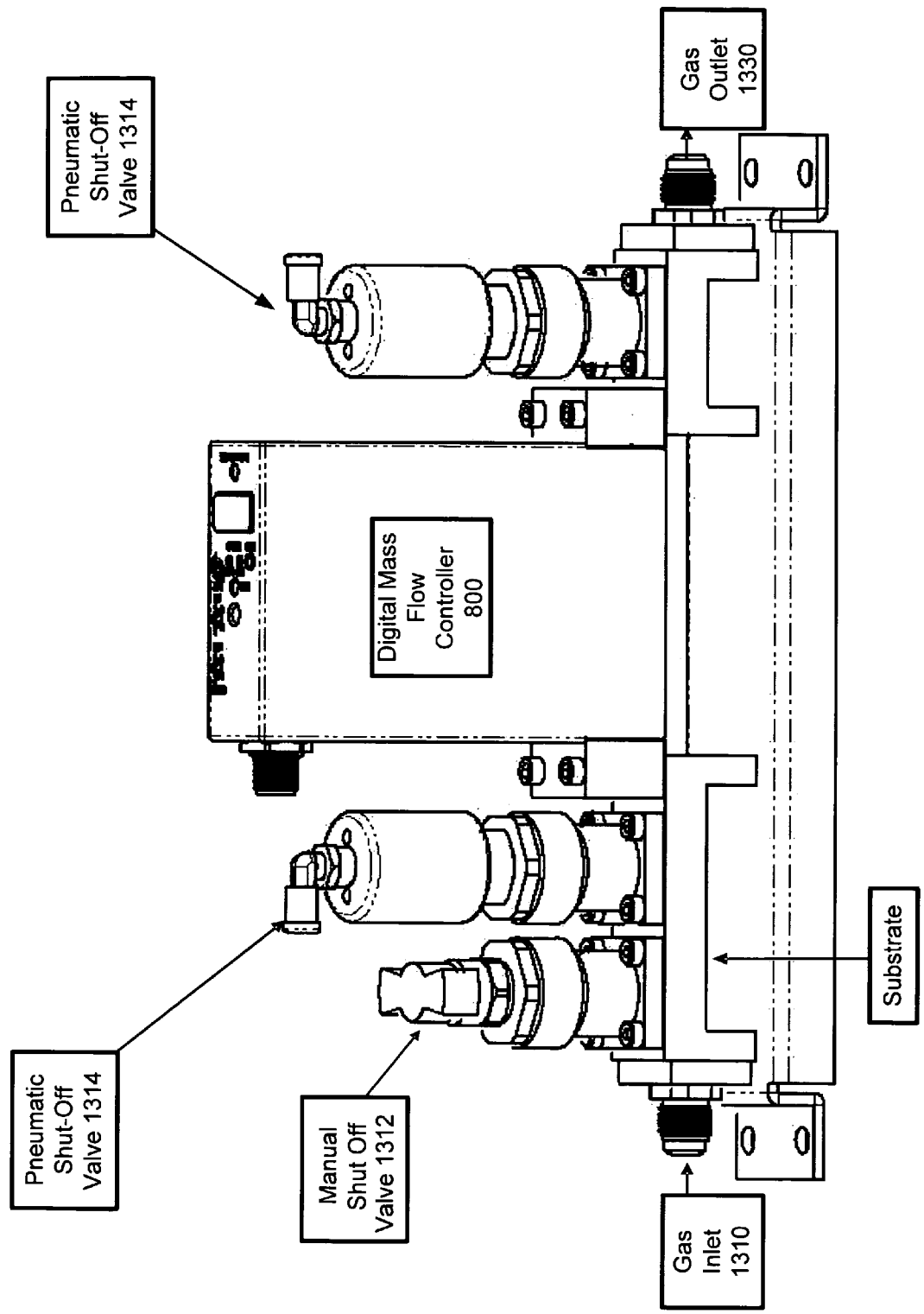
FIG. 13 includes one embodiment of a gas stick.

FIG. 13 depicts a gas stick utilizing mass flow controller 800 with reduced sensitivity to pressure fluctuations. Gas enters through gas inlet 1310 flows through manual shut-off valve 1312, mass flow controller 800, pneumatic shut-off valve 1326, finally exiting gas outlet 1330. Mass flow controller 800 is coupled to control system through I/O coupling 870 in order to regulate gas flow through gas stick 1300. Gas stick 1300, utilizing mass flow controller 800 with reduced sensitivity to pressure, does not require dedicated pressure regulators, gas filters, pressure transducers and displays including which in turn decreases the quantity of isolation valves and metal seals required for the manufacture of gas stick 1300. The smaller internal volume of reduced sensitivity mass flow controller 800 also enables more efficient purging of the gas delivery system reducing the cycle time of preventive maintenance intervals. In general utilizing gas sticks employing mass flow controllers with reduced pressure sensitivity significantly improves cost of ownership, reliability, form factor and weight of a gas panel.

It will be clear to those of ordinary skill in the art after reading this disclosure that mass flow controllers 300, 800 of the type discussed and associated control systems 400, 900 may be implemented in a wide variety of hardware, software or combination of the two. After reading this disclosure, those of ordinary skill in the art will realize which combinations and types of hardware or software will be best suited to a particular use or implementation of the disclosed systems and methods.

Note that not all of the hardware or software described is necessary, that an element may not be required, and that further elements may be utilized in addition to the ones depicted, including additional pieces of hardware or software. Additionally, the order in which each element is described is not necessarily the order in which it is utilized. After reading this specification, a person of ordinary skill in the art will be capable of determining which arrangement of hardware or software will be best suited to a particular implementation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A flow controller with reduced sensitivity to pressure, comprising:
   an inlet;
   an outlet;
   a flow path coupled to the inlet and the outlet;
   a flow sensor coupled to the flow path;
   a control valve downstream of the flow sensor and upstream of the outlet; and
   a control system operable to:
      generate a first signal corresponding to a time rate of change of pressure sensed by a pressure sensor coupled to the flow path;
      receive a second signal corresponding to a setpoint for the flow controller;
      receive a third signal corresponding to a measured flow determined by the flow sensor;
      generate an error term by combining each of the first signal, the second signal and the third signal; and
      adjust the flow controller based on the error term,
   wherein a volume of the flow path downstream of the flow sensor and upstream of the control valve is optimized.

2. The flow controller of claim 1, wherein the control valve is positioned vertically.

3. The flow controller of claim 2, wherein the optimization minimizes the volume.

4. The flow controller of claim 1, wherein the pressure sensor is coupled to the flow path downstream of the inlet and upstream of the flow sensor.

5. The flow controller of claim 4, wherein the time rate of change of pressure corresponds to the time rate of change of pressure downstream of the inlet and upstream of the flow sensor.

6. The flow controller of claim 1, wherein the first signal is calculated based on a scaled derivative of a signal from the pressure sensor.

7. The flow controller of claim 6, wherein the error term is used to generate a drive signal for the control valve.

8. The flow controller of claim 6, wherein the scaled derivative is a function of at least one factor selected from a group consisting of gas species, upstream pressure, real-time mass flow rate of gas in the flow controller, internal volume in the flow controller and gas temperature.

9. The flow controller of claim 1, wherein the error term is generated by summing the first signal, the second signal and the third signal.

10. The flow controller of claim 1, wherein the third signal is generated using a scaled derivative of a flow signal.

11. The flow controller of claim 10, wherein the flow signal is generated by enhancing the measured flow.

12. The flow controller of claim 11, wherein the flow signal includes a zero offset.

13. The flow controller of claim 11, wherein the flow signal is generated by correlating the measured flow with a mass flow standard.

14. The flow controller of claim 1, wherein the third signal corresponds to the measured flow uncompensated for pressure.

15. The flow controller of claim 1, wherein the flow sensor includes an inlet and an outlet, and wherein the pressure sensor is physically disposed prior to the inlet of the flow sensor.

16. A system for reducing the sensitivity of a flow controller to pressure, comprising:
a pressure sensor;
a flow controller, including:
an inlet;
an outlet;
a flow path coupled to the inlet and the outlet;
a flow sensor coupled to the flow path; and
a control valve downstream of the flow sensor and upstream of the outlet; and
a control system operable to:
generate a first signal corresponding to a time rate of change of pressure sensed by the pressure sensor;
receive a second signal corresponding to a setpoint for the flow controller;
receive a third signal corresponding to a measured flow determined by the flow sensor;
generate an error term by combining each of the first signal, the second signal and the third signal; and
adjust the flow controller based on the error term.

17. The system of claim 16, wherein the pressure sensor is coupled to the flow path downstream of the inlet and upstream of the flow sensor.

18. The system of claim 17, wherein the time rate of change of pressure corresponds to the time rate of change of pressure downstream of the inlet and upstream of the flow sensor.

19. The system of claim 16, wherein the first signal is calculated based on a scaled derivative of a signal from the pressure sensor.

20. The system of claim 19, wherein the error term is used to generate a drive signal for the control valve.

21. The system of claim 19, wherein the scaled derivative is a function of at least one factor selected from a group consisting of gas species, upstream pressure, real-time mass flow rate of gas in the flow controller, internal volume in the flow controller and gas temperature.

22. The system of claim 16, wherein a volume of the flow path downstream of the flow sensor and upstream of the control valve is optimized.

23. The system of claim 22, wherein the control valve is positioned vertically.

24. The system of claim 23, wherein the optimization minimizes the volume.

25. The system of claim 16, wherein the error term is generated by summing the first signal, the second signal and the third signal.

26. The system of claim 16, wherein the third signal is generated using a scaled derivative of a flow signal.

27. The system of claim 26, wherein the flow signal is generated by enhancing the measured flow.

28. The system of claim 27, wherein the flow signal includes a zero offset.

29. The system of claim 27, wherein the flow signal is generated by correlating the measured flow with a mass flow standard.

30. The system of claim 16, wherein the third signal corresponds to the measured flow uncompensated for pressure.

31. A gas stick with reduced sensitivity to pressure disturbances, comprising:
a pressure sensor coupled to the gas stick;
a flow controller coupled to the gas stick, including:
an inlet coupled to the gas stick;
an outlet coupled to the gas stick;
a flow path coupled to the inlet and the outlet;
a flow sensor coupled to the flow path; and
a control valve downstream of the flow sensor and upstream of the outlet; and
a control system coupled to the flow controller, the control system operable to:
generate a first signal corresponding to a time rate of change of pressure sensed by the pressure sensor;
receive a second signal corresponding to a setpoint for the flow controller;
receive a third signal corresponding to a measured flow determined by the flow sensor;
generate an error term by combining each of the first signal, the second signal and the third signal; and
adjust the flow controller based on the error term.

32. The gas stick of claim 31, wherein the time rate of change of pressure corresponds to the time rate of change of pressure downstream of the inlet and upstream of the flow sensor.

33. The gas stick of claim 32, wherein the pressure sensor is coupled to the flow path downstream of the inlet and upstream of the flow sensor.

34. The gas stick of claim 32, further comprising
a pneumatic shut off valve; and
a manual shut off valve.

35. The gas stick of claim 31, wherein the first signal is calculated based on a scaled derivative of a signal from the pressure sensor.

36. The gas stick of claim 35, wherein the error term is used to generate a drive signal for the control valve.

37. The gas stick of claim 36, wherein a volume of the flow path downstream of the flow sensor and upstream of the control valve is optimized.

38. The gas stick of claim 35, wherein the scaled derivative is a function of at least one factor selected from a group consisting of gas species, upstream pressure, real-time mass flow rate of gas in the flow controller, internal volume in the flow controller and gas temperature.

39. The gas stick of claim 31, wherein the error term is generated by summing the first signal, the second signal and the third signal.

40. The gas stick of claim 31, wherein the third signal is generated using a scaled derivative of a flow signal.

41. The gas stick of claim 40, wherein the flow signal is generated by enhancing the measured flow.

42. The gas stick of claim 41, wherein the flow signal includes a zero offset.

43. The gas stick of claim 41, wherein the flow signal is generated by correlating the measured flow with a mass flow standard.

44. The gas stick of claim 31, wherein the third signal corresponds to the measured flow uncompensated for pressure.

* * * * *